US008355622B2

(12) United States Patent
Harada

(10) Patent No.: US 8,355,622 B2
(45) Date of Patent: Jan. 15, 2013

(54) REPRODUCING APPARATUS, REPRODUCING SYSTEM, REPRODUCING METHOD, AND RECORDING MEDIUM THEREOF

(75) Inventor: Chihiro Harada, Tokyo (JP)

(73) Assignee: NEC Corporation, Tokyo (JP)

( * ) Notice: Subject to any disclaimer, the term of this patent is extended or adjusted under 35 U.S.C. 154(b) by 758 days.

(21) Appl. No.: 12/350,043

(22) Filed: Jan. 7, 2009

(65) Prior Publication Data

US 2009/0175597 A1    Jul. 9, 2009

(30) Foreign Application Priority Data

Jan. 7, 2008    (JP) .............................. 2008-000721

(51) Int. Cl.
*H04N 5/94* (2006.01)
(52) U.S. Cl. .................................................. 386/264
(58) Field of Classification Search .................. 386/264, 386/270, 271
See application file for complete search history.

(56) References Cited

U.S. PATENT DOCUMENTS

| 5,534,928 | A | * | 7/1996 | Iwamura | 375/240.13 |
| 5,719,646 | A | * | 2/1998 | Kikuchi et al. | 375/240.27 |
| 2005/0071724 | A1 | * | 3/2005 | Blacquiere et al. | 714/755 |
| 2009/0046595 | A1 | * | 2/2009 | Clark | 370/252 |

FOREIGN PATENT DOCUMENTS

| JP | 1987061485 A | 3/1987 |
| JP | 1991022735 A | 1/1991 |
| JP | 6-98313 A | 4/1994 |
| JP | 7-322263 A | 12/1995 |
| JP | 8-149474 A | 6/1996 |
| JP | 8-265751 A | 10/1996 |
| JP | 9-116901 A | 5/1997 |
| JP | 10-23435 A | 1/1998 |
| JP | 2002112275 A | 4/2002 |
| JP | 2003284064 A | 10/2003 |
| JP | 2003324733 A | 11/2003 |
| JP | 2006174280 A | 6/2006 |
| JP | 2006319583 A | 11/2006 |
| JP | 2007288462 A | 11/2007 |

OTHER PUBLICATIONS

Japanese Office Action for JP2008-000721 issued Nov. 4, 2009.

* cited by examiner

*Primary Examiner* — Thai Tran
*Assistant Examiner* — William Tran

(57) ABSTRACT

There are provided a reproducing apparatus, a reproducing system, a reproducing method, and a recording medium that prevent deterioration in a subjective appraisal value of an output frame. Therefore, in the case where when interpolation is impossible for a frame whose abnormality is confirmed among frames obtained by decoding image data, an already output frame is maintained until a normal frame can be output.

20 Claims, 8 Drawing Sheets

(FIRST AND SECOND EXEMPLARY EMBODIMENTS)

F I G. 4
(THIRD EXEMPLARY EMBODIMENT)
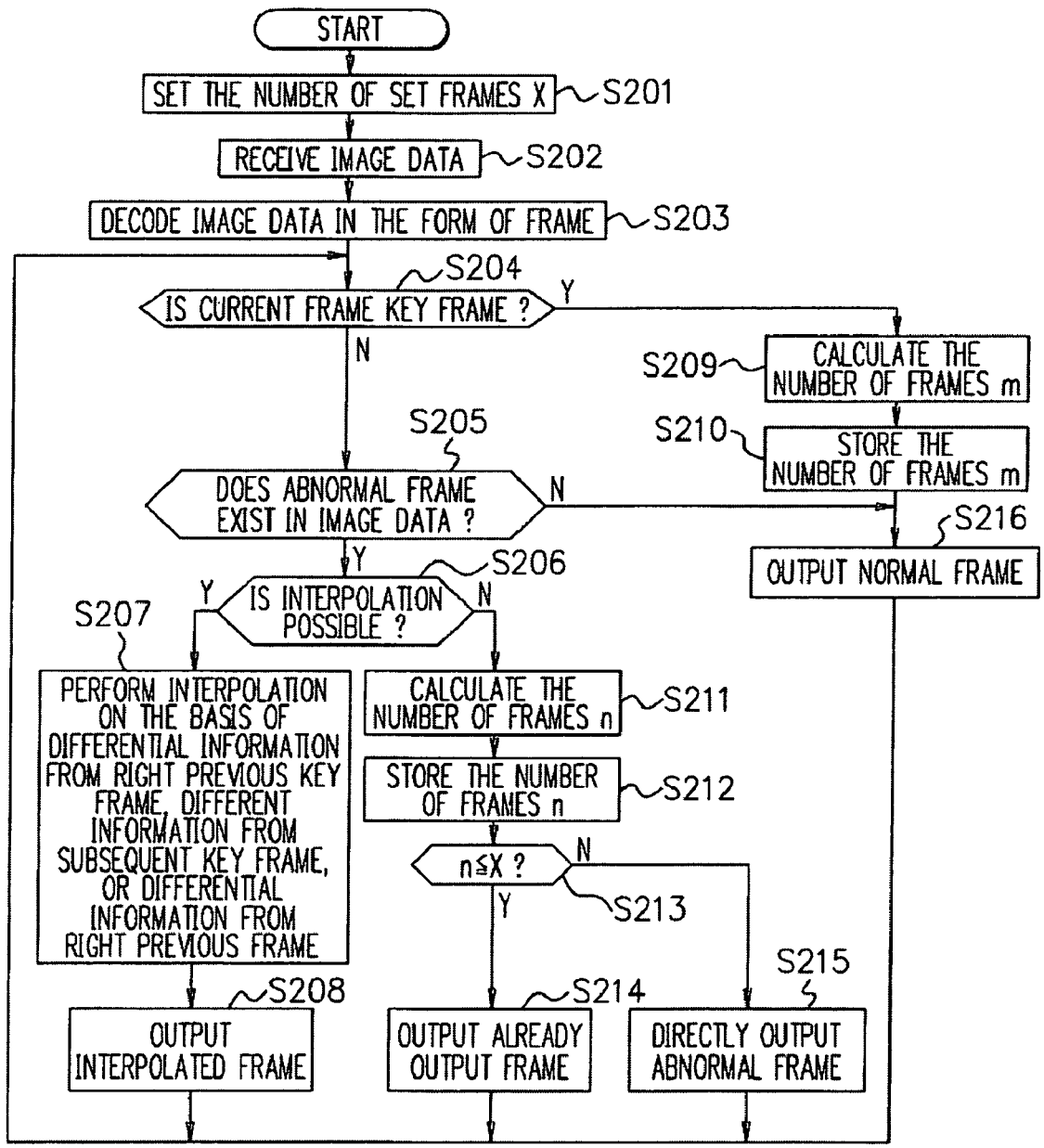

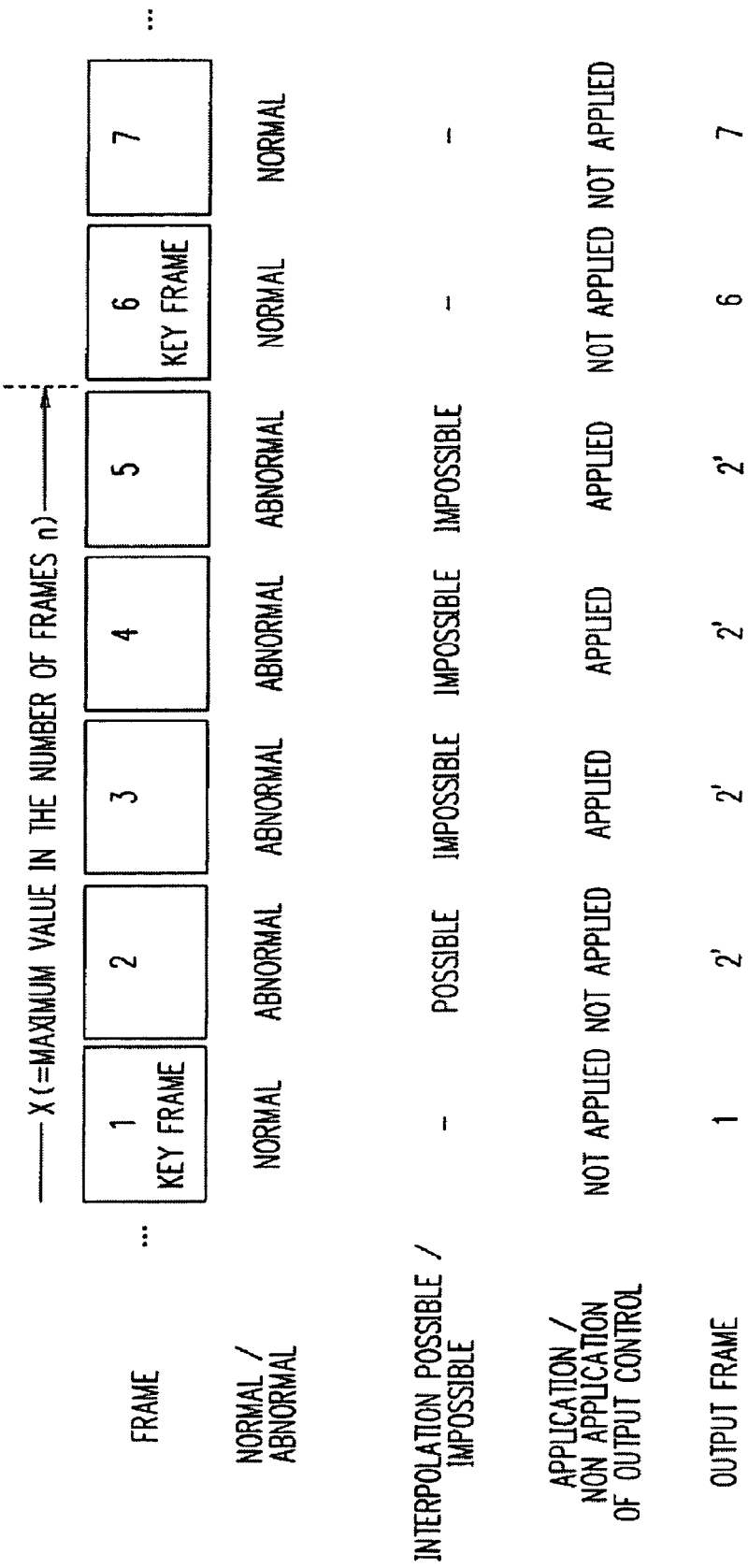

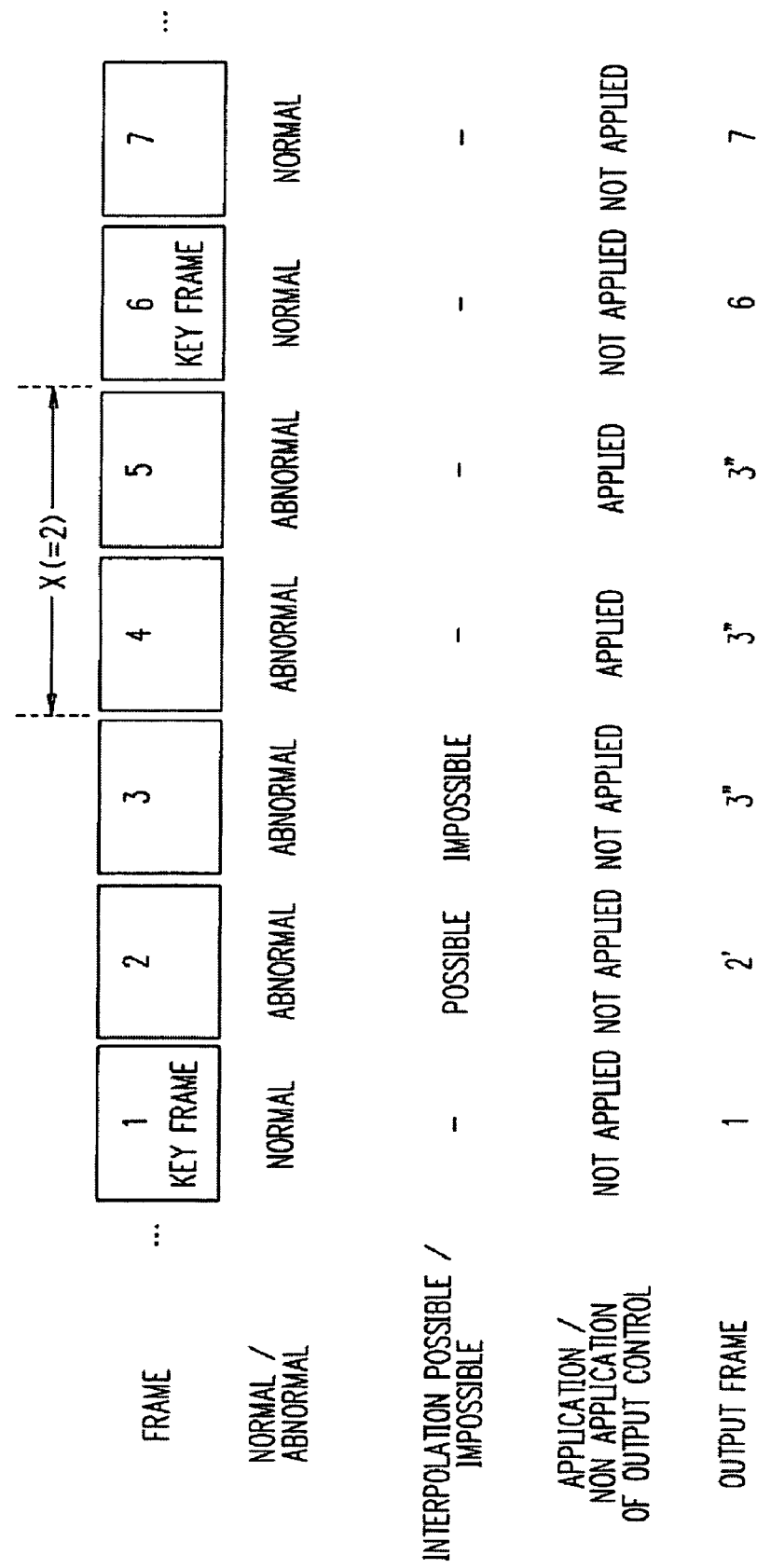

F I G. 7

(THIRD EXEMPLARY EMBODIMENT)

X (=MAXIMUM VALUE IN THE NUMBER OF FRAMES n) →

| FRAME | ... | 1 KEY FRAME | 2 | 3 | 4 | 5 | 6 KEY FRAME | 7 |
|---|---|---|---|---|---|---|---|---|
| NORMAL / ABNORMAL | | NORMAL | NORMAL | ABNORMAL | NORMAL | ABNORMAL | NORMAL | NORMAL |
| INTERPOLATION POSSIBLE / IMPOSSIBLE | | – | – | POSSIBLE | – | IMPOSSIBLE | – | – |
| APPLICATION / NON APPLICATION OF OUTPUT CONTROL | | NOT APPLIED | NOT APPLIED | NOT APPLIED | NOT APPLIED | APPLIED | NOT APPLIED | NOT APPLIED |
| OUTPUT FRAME | | 1 | 2 | 3' | 4 | 4 | 6 | 7 |

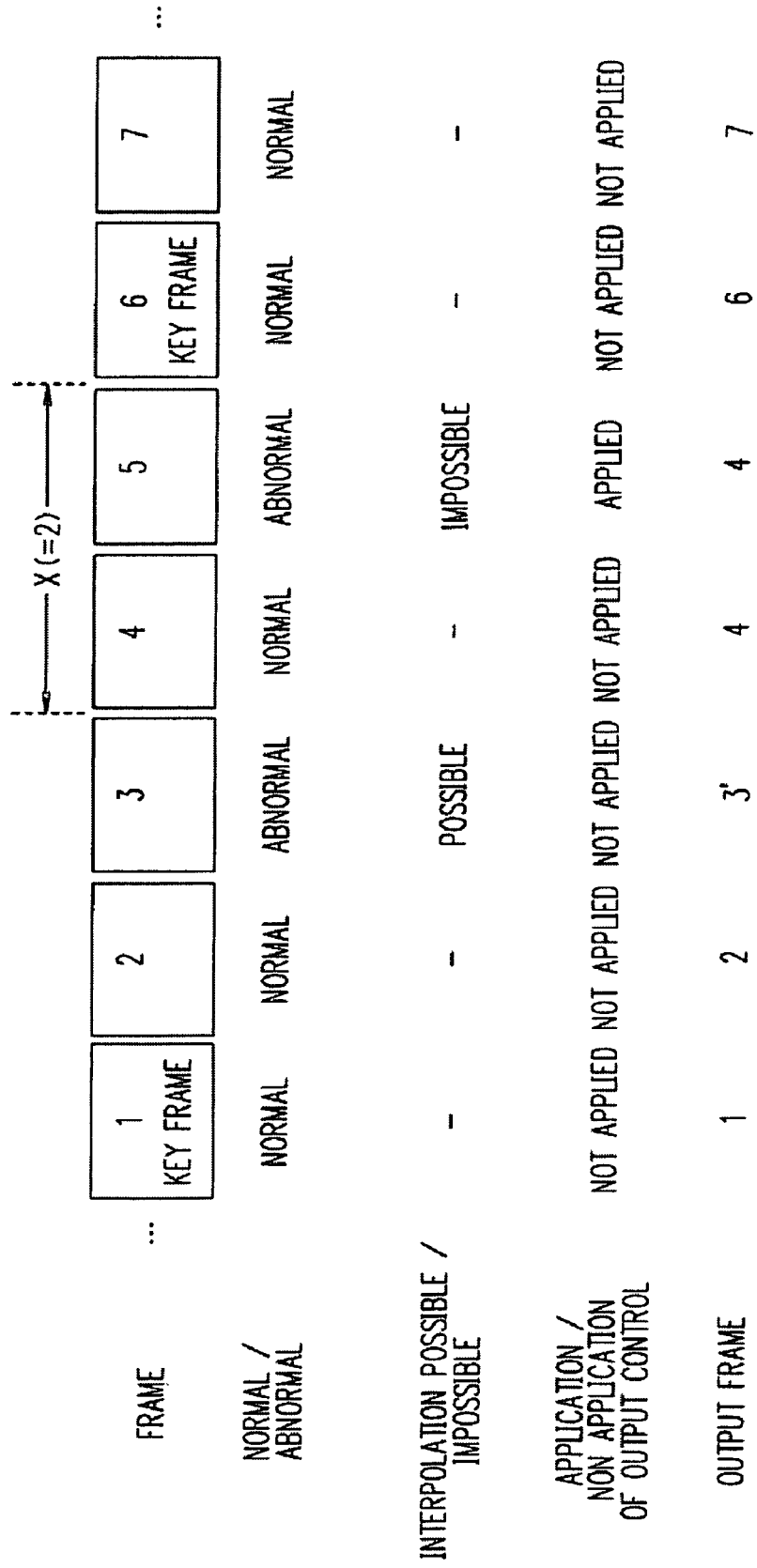

8,355,622 B2

REPRODUCING APPARATUS, REPRODUCING SYSTEM, REPRODUCING METHOD, AND RECORDING MEDIUM THEREOF

This application is based upon and claims the benefit of priority from Japanese patent application No. 2008-000721, filed on Jan. 7, 2008, the disclosure of which is incorporated herein in its entirety by reference.

BACKGROUND OF THE INVENTION

1. Field of the Invention

The present invention relates to a reproducing apparatus, a reproducing system, a reproducing method, and a recording medium.

2. Description of Related Art

Various reproducing apparatus-related technologies for reproducing an image using an interpolation technique for a portion whose image quality has been deteriorated by an abnormal frame of received image data including a plurality of frames during stream delivery have been proposed. Related technology is described below.

Japanese Patent Application Laid-Open (JP-A) No. 62-061485 (patent document 1) discloses technology of performing an interpolation process using the frame.

JP-A No. 62-061485 (patent document 1) discloses an inter-frame prediction decoding apparatus having a structure in which a second frame memory for storing previous frame data from frame data stored in a first frame memory is formed in order to integrate a differential between frames when an inter-frame prediction-coded image signal is decoded, so that the frame data stored in the second frame memory is output when a transmission line error occurs.

When detecting an error, the inter-frame prediction decoding apparatus displays an error-free image on a display unit because data transmitted to the display unit is previous data before the error is generated.

JP-A No. 03-022735 (patent document 2) discloses a technique of switching between an interpolation process and a retransmission process depending on the degree of difficulty in an interpolation process of deteriorated image quality.

An apparatus for transmitting a packet of an image signal according to patent document 2 includes a circuit forming a packet using an interpolation-easy image transmission component even when the image transmission component is lost on a transmission line, a circuit forming a packet using an interpolation-difficult image signal component when the image signal component is lost, and a circuit giving high priority to a packet where precision by which an image is deteriorated is high using a priority display region of the packet when the packet is lost.

In the apparatus for transmitting a packet of an image signal, a packet in a first group is discarded first when a packet is discard on a transmission line. Since the packet in the first group is easy to interpolate and is not important image information, an image is not deteriorated much even when the packet in the first group is discarded.

JP-A No. 2006-174280 (patent document 3) discloses a technique of determining priorities of a plurality of image-deteriorated portions existing inside a frame and performing an interpolation process in order to maintain a real-time characteristic.

An image processing apparatus of patent document 3 includes a defect detector detecting a defective portion from received moving image data, a determining unit determining priority of a defective portion in the case where a plurality of defective portions exist inside one frame of moving image data, and an interpolation processing unit performing an interpolation process on a defective portion according to the priority determined by the determining unit.

An image stretch processor of this image processing apparatus performs a decoding process on moving image stream data received by a communication processor and outputs moving image data. An image defect detector detects a defective portion from moving image data output from the image stretch processor. An interpolation priority determining unit determines priority of interpolation process on a defective portion in the case where a plurality of defective portions exist inside one frame of moving image data. An interpolation processor performs an interpolation process on a defective portion according to priority determined by the interpolation priority determining unit.

Also, there is a technique called forward error correction (FEC), which adds a parity (redundancy data) to predetermined data of a transmission side in order to perform error detection and correction processes by a reception side, and interpolates a loss using a different normal packet which does not need a retransmission process and whose reception has been completed.

Also, JP-A No. 2003-284064 (patent document 4) discloses a technique of displaying an easy-to-see image using an autonomous control at a reception side in the case where an error is detected from image data.

An image receiving apparatus according to patent document 4 includes a receiving unit receiving coded image data, a reproducing unit reproducing received image data, a display unit displaying an image obtained by the reproducing unit, a detecting unit detecting an error of received image data, a measuring unit measuring strength of error durability of received image data, and a switch unit switching an image displayed on the display unit depending on the strength of a measured strength of error durability in the case where an error is detected from received image data.

In this image receiving apparatus, a variable length decoder decodes a frame coding mode, an error detector detects an error of image data during a decoding operation by the variable length decoder, a reception interval measuring unit measures a reception interval of a key frame on the basis of the frame coding mode, and a switch controller switches an image display on a display by controlling connection/cut-off of a switch on the basis of existence of an error, the frame coding mode, and a random access interval.

JP-A No. 2006-319583 (patent document 5) discloses an apparatus for streaming and delivering image and voice data from a transmitter, receiving the image and voice data, and outputting image and voice on the basis of the received image and voice data.

The output apparatus according to patent document 5 receives data transmitted from a different apparatus, performs a loss-compensation process compensating for a loss of the received data when needed, and performs an output process on the basis of the data. The apparatus includes a detecting unit detecting a loss status of received data, a calculating unit calculating a delay time related to data output on the basis of the detected loss status, and a unit delaying the data output depending on the calculated delay time.

The output apparatus receives image and voice data, detects the number of losses that can be compensated for through the loss-compensation process from the received image and voice data, calculates a delay time related to output of the received image and voice data on the basis of a time taken for the loss-compensation process corresponding to the detected number of losses, performs the loss-compensation process compensating for the losses of the image and voice data, delays the image and voice data after the loss-compensation process by the calculated delay time, and then outputs the delayed image and voice data.

However, in a case requiring a high real-time characteristic such as a video conference, it is preferable that an amount of buffering in image data is as small as possible. When retransmission is performed as in patent document 2, an amount of buffering increases and so a real-time characteristic is damaged.

Also, in a case where a retransmission process is impossible as in streaming by multicast, it is impossible to perform a retransmission process described in patent document 2.

Also, in the case where an amount of abnormal frames is large and so an interpolation process is impossible, or when a scene is switched, a sufficient interpolation process cannot be performed using the techniques described in patent document 1 or patent document 3, so that image quality deterioration is caused.

Also, in the FEC, a reception side needs to deal with a parity added by a delivery side. In the case where data to which a parity not defined by the reception side is added is delivered, it is impossible for the reception side to perform an interpolation process.

Also, abnormality of image data described in the specification means that image data itself is lost and does not arrive at the reception side, or a portion of image data is destroyed, not a delay in arrival while image data is received. Also, abnormality of a frame means an incomplete status of a frame after decoding due to abnormality of image data.

Also, prevention of subjective image quality deterioration is not sufficient in the related arts of patent documents 4 and 5.

Here, "subjective" means an image quality appraisal of a frame by a viewer, not an objective image quality appraisal of a frame such as a Peak Signal Noise Ratio (PSNR) value.

Also, "subjective" means "scoring depending on the judgment or psychology of an individual appraisalor", and "objective" means "routinely scoring without an influence of an appraisalor's subjectivity". Appraisal of image quality by a viewer's viewing is considered "subjective" because an attitude of accepting image quality depends on the judgment or psychology of an individual even when the same frame is viewed.

SUMMARY

Accordingly, it is an object of the present invention to provide a reproducing apparatus, a reproducing system, a reproducing method, and a recording medium that prevent reduction in a subjective appraisal value of an output frame.

To achieve the object, the present invention provides the following characteristics.

An exemplary advantage according to the invention is that since retransmission is not required, it is possible to maintain a real-time characteristic against abnormality of received image data during streaming delivery, and to subjectively prevent quality reduction of an output frame even under a streaming circumstance where retransmission is impossible as in multicast. Consequently, it is possible to realize a reproducing apparatus, a reproducing system, a reproducing method, and a recording medium that prevent reduction in a subjective appraisal value of an output frame.

<Apparatus>

In one aspect of the present invention, there is provided a reproducing apparatus, wherein when interpolation is impossible for a frame whose abnormality is confirmed among frames obtained by decoding image data, the reproducing apparatus maintains an already output frame until a normal frame can be output.

<System>

In another aspect of the present invention, there is provided a reproducing system including a reproducing apparatus maintaining an already output frame until a normal frame can be output when interpolation is impossible for a frame whose abnormality is confirmed among frames obtained by decoding image data, an image data delivery server delivering image data, and a network connected to the image data delivery server.

<Method>

In still another aspect of the present invention, there is provided a reproducing method, wherein when interpolation is impossible for a frame whose abnormality is confirmed among frames obtained by decoding image data, the method maintains an already output frame until a normal frame can be output.

<Recording Medium>

In yet another aspect of the present invention, there is provided a recording medium recording a program for causing a computer to execute a process of maintaining an already output frame until a normal frame can be output when interpolation is impossible for a frame whose abnormality is confirmed among frames obtained by decoding image data.

BRIEF DESCRIPTION OF THE DRAWINGS

FIG. 4 is one example of a flowchart explaining an operation of a reproducing apparatus used for a reproducing system applying a reproducing method according to another exemplary embodiment of the present invention;

FIG. 5 is a view illustrating a relationship, where the number of set frames X is a maximum number of frames, among frames, normal/abnormal, interpolation possible/impossible, application/non application of output control, and output frames;

FIG. 6 is a view illustrating a relationship, where the number of set frames X is equal to or less than the number of frames n, among frames, normal/abnormal, interpolation possible/impossible, application/non application of output control, and output frames;

FIG. 7 is a view illustrating other relationship, where the number of set frames X is a maximum number of frames, among frames, normal/abnormal, interpolation possible/impossible, application/non application of output control, and output frames; and FIG. 8 is a view illustrating other relationship, where the number of set frames X is equal to or less than the number of frames n, among frames, normal/abnormal, interpolation possible/impossible, application/non application of output control, and output frames.

EXEMPLARY EMBODIMENT

First, an exemplary embodiment of a reproducing apparatus according to the present invention is described using first and second exemplary embodiments with reference to FIGS. 1 to 4.

The present invention provides a reproducing apparatus, a reproducing system, a reproducing method, and a recording medium that subjectively prevent quality reduction of an output frame without performing retransmission on an abnormal frame of received image data during streaming delivery.

First Exemplary Embodiment

The first exemplary embodiment describes a case where various interpolation processes are performed on an abnormal frame of received image data during streaming delivery.

A reproducing apparatus according to the embodiment prevents reduction in a subjective appraisal value of an output image by not performing output of a new image until a next key frame appears after a current frame only if there exists a predetermined number of frames until the next key frame appears in the case where an amount of abnormal frames is too large to be processed completely, or interpolation is impossible due to scene switching.

"not performing output" means maintaining an already output frame and not performing output of a current new frame.

Here, a key frame is approximately regularly inserted in Moving Picture Experts Group (MPEG) data in general. "approximately" is used because the number of frames from a key frame to a next key frame changes and so is not a constant.

Also, the "key frame" is called an I frame for a case of MPEG1/2/4 data, and called an IDR frame for a case of H.264/AVC data.

Regarding a case where a frame is continuously distorted (or confused/disturbed) for 0.3 seconds for example by abnormality of image data while a viewer views the frame, and a case where a frame suspends for 0.3 seconds temporarily, the primary object of the embodiment is that a subjective appraisal value of the latter increases.

Generally, image data used for streaming includes a key frame, and a plurality of frames (for example, 15 to 900 frames between key frames) having differential information between key frames and whose number changes.

The key frame is a frame that can be decoded into an original image from information of the key frame. Also, in the embodiment, the frame having the differential information is a frame obtained by performing differential calculation with a right previous frame (interpolation between frames). That is, in the case where a frame where a degree of image quality deterioration is high appears, since the image quality of a frame obtained by performing differential calculation on the frame is damaged, image quality until appearance of a next key frame is continuously damaged, so that subjective image quality is deteriorated.

The embodiment does not have a disadvantage of depending on specification of a transmission side such as a parity of FEC described in patent document 3.

[Construction]

Figure 1:
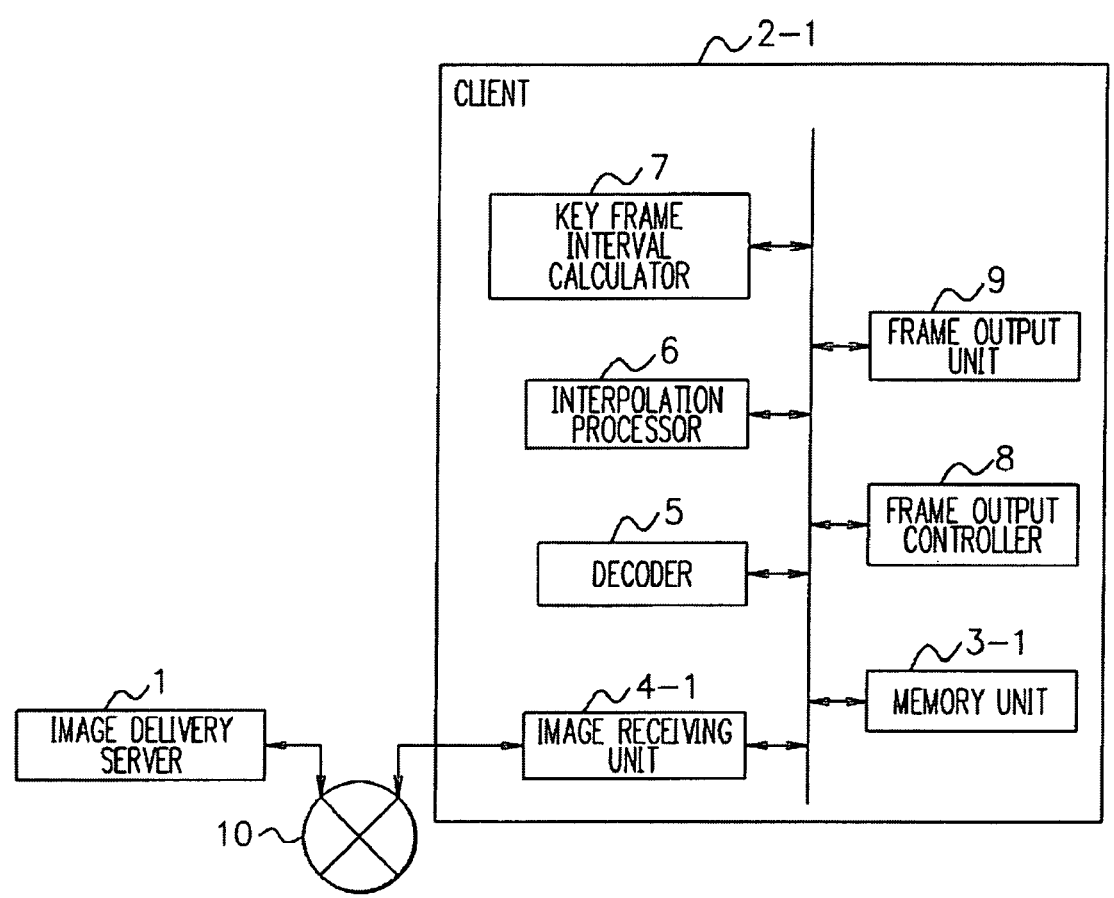
FIG. 1 is one example of a block diagram of a reproducing system applying a reproducing method in streaming delivery according to an exemplary embodiment of the present invention.

FIG. 1 is one example of a configuration of a reproducing system including a reproducing apparatus applying a reproducing method in streaming delivery according to an exemplary embodiment of the present invention.

The reproducing system includes an image data delivery server 1, a client 2-1 as a reproducing apparatus, and a network 10.

The image data delivery server 1 has an image data delivery function.

The client 2-1 as a reproducing apparatus includes a memory unit 3-1, an image data receiving unit 4-1 as a first unit, a decoder 5 as a second unit, an interpolation processor 6, a key frame interval calculator 7, a frame output controller 8 as a third unit, and a frame output unit 9.

The client 2-1 can be a personal computer (PC) or a set top box (STB), which can receive an image through streaming and decode image data from the image data delivery server 1 to output a frame.

The memory unit 3-1 can be a disk memory unit or a memory device, which can store not only image data delivered from the image data delivery server 1 but also various information such as calculated key frame interval.

The image data can be so-called moving image data, image data where the same frame such as a landscape is successive, or image data where different frames such as a walking person are successive is applicable.

The image receiving unit 4-1 receives streaming-delivered image data, and determines there exists an abnormal frame of the image data. When the image receiving unit 4-1 receives streaming-delivered image data from the image data delivery server 1 and an error such as a loss is found in the received image data, the memory unit 3-1 stores a loss location together so that the decoder 5 can determine the loss exists among the image data when the decoder 5 reads and outputs image data from the memory unit 3-1.

The decoder 5 decodes received image data to form a frame, includes a function to determine whether a decoded frame is a key frame or not, and includes a function to determine whether interpolation can be performed on an abnormal frame.

Here, the determining of whether the decoded frame is the key frame can be performed using various methods depending on a standard of a codec. Generally, whether the decoded frame is the key frame can be determined from a header inside data during a decoding operation.

The interpolation processor 6 performs interpolation (interpolation between frames) using differential information from a previous frame obtained by the decoder 5, or performs interpolation of an image in the case where interpolation inside a frame is determined possible. Here, the interpolation inside a frame means interpolation of a frame using a packet forming one frame.

The key frame interval calculator 7 calculates an appearing interval m of a key frame in the case where the decoder 5 determines the key frame. Also, the key frame interval calculator 7 compares a key frame appearing interval m with a past key frame appearing interval m' to calculate (approximately computing) after which number of frames from a current abnormal frame (including a frame whose interpolation is impossible) a key frame is to appear, thereby obtaining an estimated value. This is because when the key frame appearing interval m is not determined in determining whether to apply non-performance of outputting a new frame to a current abnormal frame. It cannot be determined whether or not the abnormal frame is located within a range of the number of set frames X.

Here, regarding which equation is used to calculate the key frame appearing interval m, it can be calculated by measuring an average of appearing intervals of key frames. In case of calculating the key frame appearing interval from an appearing frequency of P times in the past, when each interval is N ( ), a key frame interval S is given by Equation 1, for example.

Equation 1

$$S = \sum_{m=1}^{P} \frac{N(m)}{P} \quad (1)$$

Also, regarding calculation of after which frames from a current abnormal frame a key frame is to appear, assuming that the number of frames until a current abnormal frame appears since appearance of a previous key frame is T, the number of frames n until a next key frame appears since a current frame is given by Equation 2.

$$N = S - T \quad (2)$$

Also, since a frame rate is constant for each frame, a time (location) can be estimated from the number of frames T and n.

The frame output controller 8 controls the frame output unit 9 to maintain an already output frame until a normal frame or an interpolation-completed frame can be output in the case where the number of frames until appearance of a next key frame since a frame whose interpolation is impossible is the number of set frames X or less. Also, the frame output controller 8 controls the frame output unit 9 to directly output an abnormal frame in the case where the number of frames until appearance of a next key frame since a frame whose interpolation is impossible is the number of set frames X or more.

Whether to perform output of a current frame is determined depending on whether received image data is abnormal or not, depending on whether the number of set frames X is equal to or more than n that is the number of frames until a next key frame appears since a current key frame when the received image data is abnormal, and depending on whether interpolation is impossible or not.

That is, in the case where the received image data is abnormal, interpolation is impossible, and the number of frames n is the number of set frames X or less, "an already output frame is maintained until a normal frame or an interpolation-completed frame can be output in the case where interpolation is impossible for an abnormal frame among frames whose image data have been decoded".

On the other hand, in the case where frames obtained by decoding received image data include an abnormal frame, interpolation is impossible, and the number of frames n is greater than the number of set frames X, "an already output frame is not maintained", but a current abnormal frame is directly output.

The frame output controller 8 controls whether to perform output depending on the above-described conditions, and the frame output unit 9 performs output in response thereto.

The frame output unit 9 is a unit (renderer) outputting image data to outside.

[Operation]

Figure 2:
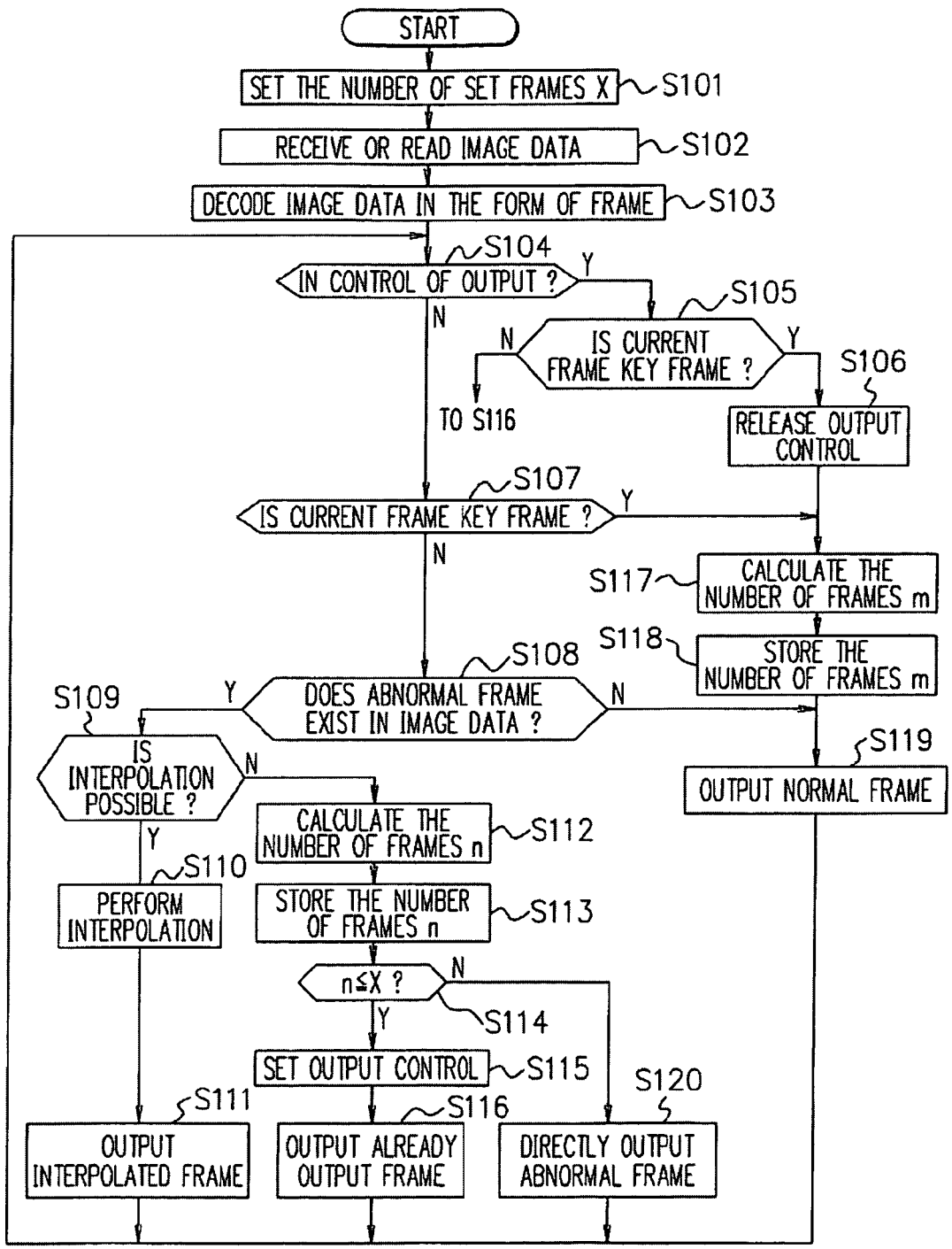
FIG. 2 is one example of a flowchart explaining an operation of a reproducing apparatus used for the reproducing system illustrated in FIGS. 1 and 3.

An operation for a case where a viewer views image data in the reproducing system of FIG. 1 is described in detail with reference to FIGS. 1 and 2. FIG. 2 is an exemplary flowchart explaining an operation of a reproducing apparatus used for the reproducing system illustrated in FIG. 1. The embodiment described a case of receiving image data from an image data delivery server. Therefore, in step S102, image data is received.

First, in the client 2-1, a viewer sets the number of set frames X in step S101.

In step S102, when the image data delivery server 1 delivers image data to the client 2-1 through a network 10, the image receiving unit 4-1 of the client 2-1 receives the image data.

In step S103, the decoder 5 of the client 2-1 decodes the received image data to generate a frame.

In step S104, whether the frame output controller 8 is in control of output, that is, whether the frame output controller 8 maintains an already output frame is determined. This is for determining whether an abnormal frame whose interpolation is impossible appears successively.

When the frame output controller 8 is in control of output, in step S105, whether a current frame is a key frame or not is determined. This is because the key frame has information that can independently output a normal image. When the current frame is determined to be the key frame in step S105, output control is released in step S106.

After the output release, in step S117, the key frame interval calculator 7 calculates an appearing interval m between key frames, that is, the number of frames m between a key frame and a next key frame. This is for calculating (approximately computing) after which frames from a current frame a key frame appears.

In step S118, the memory unit 3-1 stores the appearing interval m of the key frame.

In step S119, a key frame, which is a normal frame, is output from the frame output unit 9. After the key frame is output, step S102 is performed.

When it is determined that the current frame is not the key frame in step S105, an already output frame is output in step S116. After the already output frame is output, step S102 is performed.

When the frame output controller 8 is not in control of output in step S104, whether the current frame is the key frame is determined in step S105.

When it is determined that the current frame is the key frame, step S117 is performed.

When it is determined that the current frame is not the key frame, step S108 is performed.

In step S108, whether the current frame is an abnormal frame or not is determined. When it is determined that the current frame is not the abnormal frame, step S119 is performed and a normal frame is output.

In step S108, when it is determined that the current frame is the abnormal frame, the decoder 5 determines whether interpolation is possible in step S109.

When the decoder 5 determines interpolation of the abnormal frame is possible, in step S110, the interpolation processor 6 performs interpolation.

In step S111, the frame output unit 9 outputs an interpolation-processed frame, and step S102 is performed.

When the decoder 5 determines that the interpolation of the abnormal frame is not possible, in step S112, the key frame interval calculator 7 calculates the number of frames n up to a next key frame.

In step S113, the memory unit 3-1 stores the number of frames n up to a next key frame in order to compare the number of frames n with the number of set frames X.

In step S114, the frame output controller 8 determines whether the number of frames n is the number of set frames X or less (n≦X). That is, the frame output controller 8 controls the frame output unit to maintain an already output frame until a normal frame or an interpolation-completed frame can be output depending on size relation between the number of frames n and the number of set frames X set in advance.

When it is determined the number of frames n is the number of set frames X or less, the frame output controller 8 sets output control in step S115.

In step S116, the frame output unit 9 outputs an already output frame, and step S102 is performed.

When it is determined that the number of frames n is not the number of set frames X or less (n>X), in step S120, the frame output controller 8 directly outputs an abnormal frame. After the abnormal frame is output, step S102 is performed.

Also, technique of interpolation from a previous frame, or interpolation within a frame is not repeated in the specification.

According to the above construction, it is possible to maintain a real-time characteristic with respect to an abnormal frame of received image data during a streaming delivery, and also subjectively prevent deterioration in the quality of an output frame even under a streaming condition where retransmission is impossible such as multicast.

This is because the present invention does not require retransmission.

Also, according to the above construction, it is possible to subjectively prevent deterioration in the quality of an output image even in the case where there are many abnormal frames, or in the case where interpolation is impossible due to scene switching. This is because the interval between key frames is obtained and an output frame is controlled, that is, output of an already output frame is maintained.

Also, according to the above construction, it is possible for a reception side to subjectively prevent deterioration in the quality of an output frame without depending on specification of a transmission side such as a parity of FEC described in patent document 3. This is because special information or data except received image data is not required when the present invention is embodied.

Second Exemplary Embodiment

[Construction]

Figure 3:
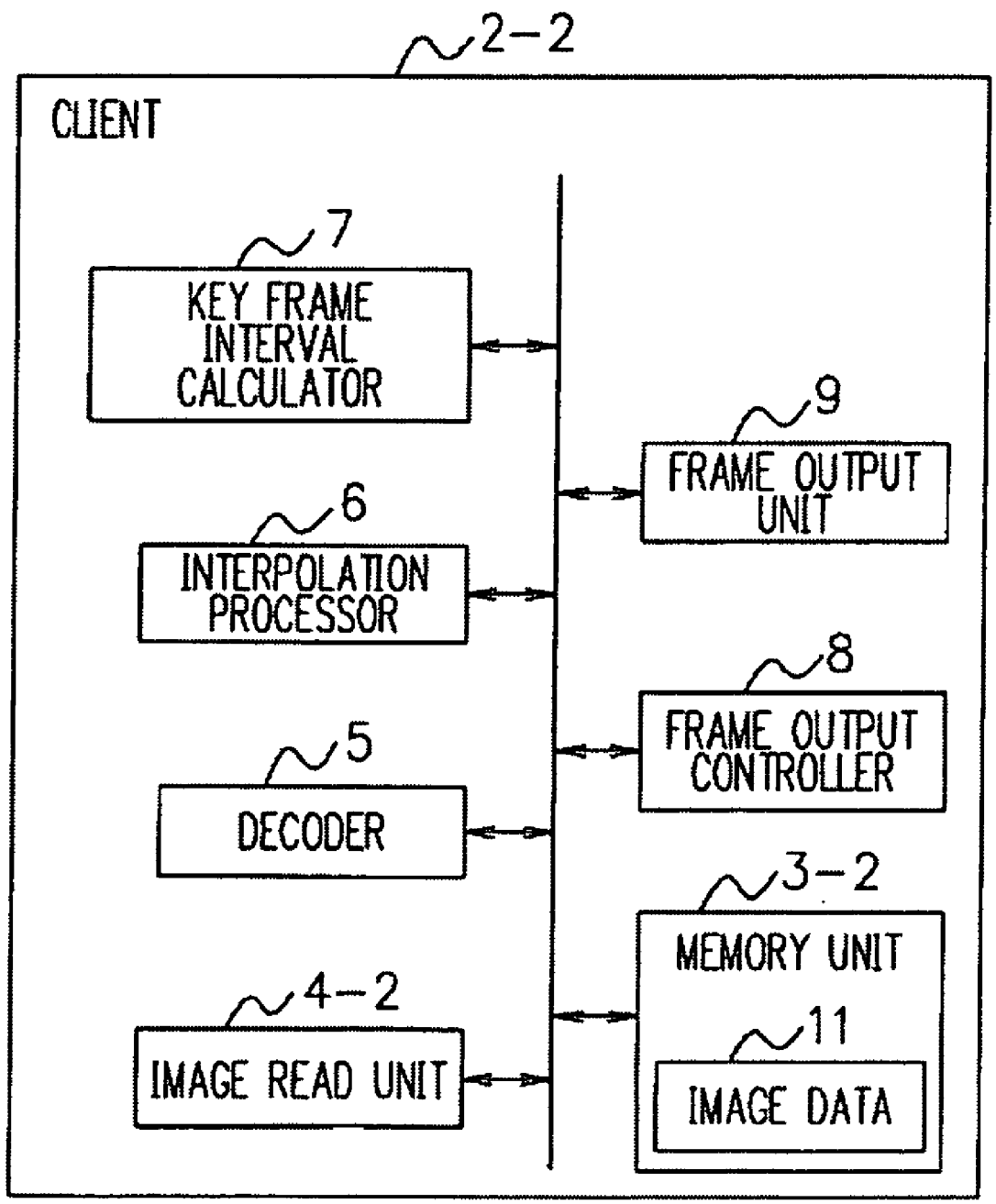
FIG. 3 is one example of a block diagram of a reproducing apparatus applying a reproducing method in streaming delivery according to another exemplary embodiment of the present invention.

FIG. 3 is a block diagram of a reproducing apparatus applying a reproducing method in streaming delivery according to another exemplary embodiment of the present invention.

Meanwhile, the same reference numerals are used for the same units as those of FIG. 1.

Reproducing image data multiplexed (MUX) in an MPEG2 transport stream (TS) (hereinafter, referred to as an MPEG2-TS type) recorded by a memory unit is described in detail with reference to FIG. 3.

The MPEG2-TS type is generally widely used in delivery of image data such as digital broadcasting and streaming.

Image data 11 is image data multiplexed (MUX) in the form of an MPEG2-TS type, which is an object of reproduction.

A client 2-2 as a reproducing apparatus is an apparatus that can output a frame, such as a PC and a STB.

A memory unit 3-2 is a disk memory unit (for example, a digital versatile disc (DVD)), or a memory device. The memory unit 3-2 stores various information such as a calculated key frame interval. Meanwhile, description of a memory unit storing an operating program is not repeated.

An image data read unit 4-2 reads image data 11 from the memory unit 3-2.

A decoder 5 includes a function to decode the image data 11 read by the image data read unit 4-2, a function to determine whether a frame obtained by decoding the image data 11 is a key frame or not, and a function to determine whether interpolation of an abnormal frame is possible among frames obtained by decoding the image data 11.

An interpolation processor 6 performs interpolation of an image when the decoder 5 determines interpolation from a previous frame or interpolation within a frame is possible.

A key frame interval calculator 7 calculates an appearing interval of key frames when the decoder 5 determines a frame as a key frame. Also, the key frame interval calculator 7 compares a key frame interval with a past key frame interval to approximately calculate after which frames from a current frame a key frame appears.

A frame output controller 8 determines whether a frame output unit 9 performs output of an image.

The frame output unit 9 outputs a frame to outside.

A detailed process sequence of the reproducing apparatus of FIG. 3 is described with reference to FIG. 2.

The embodiment describes a case of reading image data of a memory unit. Therefore, in step S102, reading of image data is performed.

First, in the client 2-2, a viewer sets the number of set frames X in step S101.

In step S102, the image data read unit 4-2 of the client 2-2 reads image data 11 from the memory unit 3-2.

In step S103, the decoder 5 decodes the image data in the form of a frame.

Here, whether a frame is abnormal or not after the decoding of the image data 11 is determined using a technique of checking continuity in the sequence number of an MPEG2-TS type header. When there exists an abnormal frame, the memory unit 3-2 stores the location of an abnormal frame so that the decoder 5 can determine the abnormal frame exists among the image data 11.

Since steps S104 to S120 are the same as those of the first exemplary embodiment, descriptions thereof are not repeated.

Also, a value of the number of set frames X is not fixed to a specific value, but may change depending on a frame rate, a key frame interval, or whether to adapt the present technique from which degree of a range between key frames. When it is determined that the number of frames n is greater than the number of set frames X in step S114/N, an output image is deteriorated. Therefore, it is possible to completely prevent deterioration of an image by setting a value of the number of set frames X to a maximum value of a key frame interval for example.

According to the above construction, it is possible to maintain a real-time characteristic with respect to an abnormal frame after decoding of received image data during a streaming delivery, and also subjectively prevent deterioration in the quality of an output frame even under a streaming condition where retransmission is impossible such as multicast. This is because the present invention does not require retransmission.

Also, according to the above construction, it is possible to subjectively prevent deterioration in the quality of an output image even in the case where there are many abnormal frames, or in the case where interpolation is impossible due to scene switching. This is because the interval between key frames is obtained and control of image output is performed.

Also, according to the above construction, it is possible for a reception side to subjectively prevent deterioration in the quality of an output frame without depending on specification of a transmission side such as a parity of FEC described in patent document 3. This is because special information or data except received data is not required when the present invention is embodied.

Third Exemplary Embodiment

Next, still another exemplary embodiment of the present invention is described with reference to FIG. 4.

FIG. 4 is one example of a flowchart explaining an operation of a reproducing apparatus used for a reproducing system applying a reproducing method according to another exemplary embodiment of the present invention.

A difference between the reproducing apparatus of the first exemplary embodiment and the reproducing apparatus of FIG. 4 is that interpolation can be performed on the basis of differential information from a right previous key frame or a subsequent key frame in the case where interpolation of an abnormal frame is possible.

According to the embodiment, reproduction is possible even when interpolation of a right previous frame is impossible. This is because interpolation of data can be possible using differential information from a key frame. Interpolation is performed using data from a key frame and differential information from a key frame that belongs to an object frame. In case of interpolation based on differential information from a subsequent key frame, data of frames from an object frame to the subsequent key frame are stored in a buffer memory (not shown), data of the subsequent key frame and differential information of the object frame with a key frame are read and output, so that interpolation is performed.

The operation of a reproducing apparatus according to an exemplary embodiment is described below.

First, in the client 2-1, a viewer sets the number of set frames X in step S201.

In step S202, when the image data delivery server 1 delivers image data to the client 2-1 through the network 10, the image receiving unit 4-1 of the client 2-1 receives the image data.

In step S203, the decoder 5 of the client 2-1 decodes the received image data to generate a frame.

In step S204, whether a current frame is a key frame or not is determined. When it is determined that the current frame is the key frame, in step S209, the key frame interval calculator 7 calculates an appearing interval m between key frames, that is, the number of frames m between a key frame and a next key frame.

In step S210, the memory unit 3-1 stores the appearing interval m of the key frame.

In step S216, the frame output unit 9 outputs a key frame, which is a normal frame. After the output of the key frame, step S204 is performed.

When the current frame is not a key frame, in step S205, the image receiving unit 4-1 determines whether the current frame is an abnormal frame.

Here, the current frame which is an object, can have differential information according to the following four methods.

(1) All frames have differential information from a right previous key frame.

(2) A plurality of specific frames have differential information from a key frame, and other frames have differential information from a right previous frame as in the first exemplary embodiment.

(3) Of frames having differential information from a key frame, a frame existing in the front portion between key frames has differential information with a right previous key frame, and a frame existing in the rear portion has differential information with a subsequent key frame (it is assumed that whether a central frame has differential information of a right previous key frame or has differential information of a subsequent key frame in the case where the number of frames between key frames is an odd number is set in advance).

(4) Of frames having differential information from a key frame, a frame existing in the front portion between key frames has differential information with a right previous key frame, and a frame existing in the rear portion has differential information with a subsequent key frame, and some of frames, for example, a frame in the central portion has differential information from a right previous frame as in the first exemplary embodiment.

Accordingly, operations after step S205 are individually described.

(1) In the case where all frames have differential information from a right previous frame,
  when a current frame is not an abnormal frame, in step S216, the frame output unit 9 outputs a normal frame. After the normal frame is output, step S202 is performed.

When it is determined that the current frame is the abnormal frame in step S205, the decoder 5 determines whether interpolation is possible in step S206.

When the decoder 5 determines that the interpolation is possible, in step S207, the interpolation processor 6 performs the interpolation on the basis of differential information from a right previous key frame.

In step S208, an interpolation-processed frame is output from the frame output unit 9, and step S202 is performed.

When the decoder 5 determines that the interpolation is impossible in step S206, the key frame interval calculator 7 calculates the number of frames n up to a next key frame in step S211.

In step S212, the memory unit 3-1 stores the number of frames n up to the next key frame in order to compare the number of frames n with the number of set frames X.

In step S213, the frame output controller 8 determines whether the number of frames n is the number of set frames X or less (n≦X). That is, in step S214, the frame output controller 8 controls the frame output unit to maintain an already output frame until a normal frame or an interpolation-completed frame can be output depending on size relation between the number of frames n and the number of set frames X set in advance.

When the frame output controller 8 determines that the number of frames n is the number of set frames X or less, in step S214, the frame output unit 9 outputs the already output frame, and step S202 is performed.

When the frame output controller 8 determines that the number of frames n is not the number of set frames X or less (n>X), in step S215, an abnormal frame is directly output, and step S202 is performed.

(2) In the case where a specific frame has differential information from a key frame, and other frames have differential information from a right previous frame as in the first exemplary embodiment,
  when a current frame is not an abnormal frame, in step S216, the frame output unit 9 outputs a normal frame. After the normal frame is output, step S202 is performed.

When the current frame is the abnormal frame in step S205, the decoder 5 determines whether interpolation is possible in step S206.

When the decoder 5 determines that the interpolation is possible, in step S207, the interpolation processor 6 performs the interpolation on the basis of differential information from a right previous key frame or differential information from a right previous frame.

In step S208, an interpolation-processed frame is output from the frame output unit 9, and step S202 is performed.

When the decoder 5 determines that the interpolation is impossible in step S206, the key frame interval calculator 7 calculates the number of frames n up to a next key frame in step S211.

In step S212, the memory unit 3-1 stores the number of frames n up to the next key frame in order to compare the number of frames n with the number of set frames X.

In step S213, the frame output controller 8 determines whether the number of frames n is the number of set frames X or less (n≦X). That is, the frame output controller 8 controls the frame output unit to maintain an already output frame until a normal frame or an interpolation-completed frame can be output depending on size relation between the number of frames n and the number of set frames X set in advance.

When the frame output controller 8 determines that the number of frames n is the number of set frames X or less, in step S214, the frame output unit 9 outputs the already output frame, and step S202 is performed.

When the frame output controller 8 determines that the number of frames n is not the number of set frames X or less (n>X), in step S215, an abnormal frame is directly output, and step S202 is performed.

(3) In the case where of frames having differential information from a key frame, a frame existing in the front portion between key frames has differential information with a right previous key frame, and a frame existing in the rear portion has differential information with a subsequent key frame, when a current frame is not an abnormal frame, in step S216, the frame output unit 9 outputs a normal frame. After the normal frame is output, step S202 is performed.

When it is determined that the current frame is the abnormal frame in step S205, the decoder 5 determines whether interpolation is possible in step S206.

When the decoder 5 determines the interpolation is possible, in step S207, the interpolation based on differential information from a subsequent key frame is performed by storing a key frame subsequent to an object frame in the buffer memory and reading the same as described above.

In step S208, the frame output unit 9 outputs an interpolation-processed frame, and step S202 is performed.

(4) In the case where of frames having differential information from a key frame, a frame existing in the front portion between key frames has differential information with a right previous key frame, and a frame existing in the rear portion has differential information with a subsequent key frame, and a frame in the central portion has differential information from a right previous frame as in the first exemplary embodiment, when a current frame is not an abnormal frame, in step S216, the frame output unit 9 outputs a normal frame. After the normal frame is output, step S202 is performed.

When it is determined that the current frame is the abnormal frame in step S205, the decoder 5 determines whether interpolation is possible in step S206.

When the decoder 5 determines the interpolation is possible, in step S207, the interpolation is performed on the basis of differential information from a right previous key frame, differential information from a subsequent key frame or differential information from a right previous frame.

In step S208, the frame output unit 9 outputs an interpolation-processed frame, and step S202 is performed.

When the decoder 5 determines that the interpolation is impossible in step S206, the key frame interval calculator 7 calculates the number of frames n up to a next key frame in step S211.

In step S212, the memory unit 3-1 stores the number of frames n up to the next key frame in order to compare the number of frames n with the number of set frames X.

In step S213, the frame output controller 8 determines whether the number of frames n is the number of set frames X or less (n≦X). That is, the frame output controller 8 controls the frame output unit to maintain an already output frame until a normal frame or an interpolation-completed frame can be output depending on size relation between the number of frames n and the number of set frames X set in advance.

When the frame output controller 8 determines that the number of frames n is the number of set frames X or less, in step S214, the already output frame is output from the frame output unit 9, and step S202 is performed.

When the frame output controller 8 determines that the number of frames n is not the number of set frames X or less (n>X), in step S215, the abnormal frame is directly output, and step S202 is performed.

<Program and Recording Medium>

The above-described reproducing apparatus according to the present invention is realized using a reproducing program causing a computer to execute a reproducing process.

In one exemplary embodiment, a reproducing program causes a computer of a reproducing apparatus to execute a process of maintaining an already output frame until a normal frame can be output when interpolation is impossible for a frame whose abnormality is confirmed among frames obtained by decoding image data.

That is, the program according to the embodiment is a program causing a computer to execute a process (a) of maintaining an already output frame until a normal frame can be output when interpolation is impossible for a frame whose abnormality is confirmed among frames obtained by decoding image data.

Also, in addition to the process (a), the program may cause a computer to execute processes of (b) determining, at a first unit, whether a frame is abnormal or not, (c) determining, at a second unit, whether interpolation is possible for a frame determined abnormal by the first unit, and (d) maintaining, at a third unit, output of an already output frame when the interpolation is determined impossible by the second unit.

Also, in addition to the processes (a) to (d), the program may cause a computer to execute a process of (e) maintaining, at the third unit, output of an already output frame when a frame whose interpolation is determined impossible by the second unit exists within a predetermined number of frames from a subsequent key frame.

Also, in addition to the processes (a) to (d), or (a) to (e), the program may cause a computer to execute a process of (f) outputting, at the third unit, the frame when a frame whose interpolation is determined impossible by the second unit does not exist within a predetermined number of frames from a subsequent key frame.

The frame has differential information with a right previous frame, and in addition to the processes (a) to (d), (a) to (e), or (a) to (f), the program may cause a computer to execute a process of (g) performing, at the second unit, interpolation on the basis of differential information.

Also, in addition to one of the processes (a) to (d), (a) to (e), (a) to (f), and (a) to (g), the program may cause a computer to execute a process of (h) continuing to maintain, at the third unit, output until a subsequent key frame appears when a process of maintaining the output of the already output frame has been performed.

Also, in addition to one of the processes (a) to (d), (a) to (e), (a) to (f), (a) to (g), and (a) to (h), the program may further cause a computer to execute processes of (i) determining, at the first unit, whether a frame is a key frame, and (j) calculating, at a key frame interval calculator, a frame interval between a key frame and a next key frame.

The frame has at least one of differential information with a right previous frame, differential information with a right previous key frame, and differential information with a subsequent key frame, and in addition to the processes (a) to (d), the program may cause a computer to execute processes of (k) performing, at the second unit, interpolation on the basis of the differential information, and (l) maintaining, at the third unit, output of the already output frame until a normal frame can be output.

According to the above construction, it is possible to maintain a real-time characteristic with respect to an abnormal frame after decoding of received image data during a streaming delivery, and also subjectively prevent deterioration in the quality of an output image even under a streaming condition where retransmission is impossible such as multicast. This is because the present invention does not require retransmission.

Also, according to the above construction, it is possible to subjectively prevent deterioration in the quality of an output image even in the case where there are many abnormal frames, or in the case where interpolation is impossible due to scene switching. This is because the interval between key frames is obtained and control of image output is performed.

Also, according to the above construction, it is possible for a reception side to subjectively prevent deterioration in the quality of an output image without depending on specification of a transmission side such as a parity of FEC. This is because special information or data except received data is not required when the present invention is embodied.

Examples of a computer include a general use computer such as a personal computer (PC) and a work station, but the computer is not limited thereto.

Therefore, when given a computer environment where a reproducing program can be executed, a reproducing apparatus according to the present invention can be realized in anywhere.

The reproducing program may be stored on a computer readable recording medium.

Here, examples of the recording medium include a computer readable recording medium such as a compact disc read only memory (CD-ROM), a flexible disc (FD), a CD-recordable (CD-R), and a digital versatile disk (DVD). Also, the recording medium also includes a semiconductor memory such as a flash memory, random access memory (RAM), read only memory (ROM), and ferroelectric random access memory (FeRAM), and a hard disc drive (HDD).

Also, the above-described embodiments represent examples of a preferred embodiment of the present invention. The present invention is not limited thereto but can be embodied in various modifications without departing from the sprit and scope of the present invention. For example, though description has been made for the case where the number of frames between a key frame and the next key frame changes in the above embodiment, the present invention is not limited thereto but is applicable to a case where a frame interval between the key frame and the next key frame is fixed. In this case, the key frame interval calculator is not required and the key frame interval needs to be stored in the memory unit.

First, the reproducing apparatus described in the example 1 maintains an already output frame until a normal frame can be output when interpolation is impossible for a frame whose abnormality is confirmed among frames obtained by decoding image data.

In the reproducing apparatus of the example 1, the reproducing apparatus described in an example 2 includes a first unit for determining abnormality of the frame, a second unit for determining whether interpolation is processable on a frame determined to be abnormal by the first unit, and a third unit for maintaining output of the already output frame when the interpolation is determined not to be processable by the second unit.

In the reproducing apparatus of the example 2, the reproducing apparatus described in an example 3 maintains the output of the already output frame when a frame whose interpolation is determined to be impossible by the second unit exists within a predetermined number of frames from a subsequent key frame.

In the reproducing apparatus of the example 2 or 3, the reproducing apparatus described in an example 4 outputs the frame when a frame whose interpolation is determined to be impossible by the second unit does not exist within a predetermined number of frames from a subsequent key frame.

In the reproducing apparatus of the example 2, 3, or 4, the reproducing apparatus described in an example 5 is characterized in that the frame has differential information with a right previous frame, and the second unit performs interpolation on the basis of the differential information.

In the reproducing apparatus of one of the examples 2 to 5, the reproducing apparatus described in an example 6 is characterized in that the third unit continues to maintain the output until the subsequent key frame appears when the process of maintaining the output of the already output frame has been performed.

In the reproducing apparatus of one of the examples 3 to 6, the reproducing apparatus described in an example 7 is characterized in that the first unit determines whether the frame is a key frame or not, and the apparatus further includes a key frame interval calculator calculating a frame interval from the key frame to a next key frame.

In the reproducing apparatus of the example 2, the reproducing apparatus described in an example 8 is characterized in that the frame has at least one of differential information with a right previous frame, differential information with a right previous key frame, and differential information with a subsequent key frame, and the second unit performs interpolation on the basis of the differential information, and the third unit maintains the output of the already output frame until a normal frame can be output.

In the reproducing apparatus of the examples 1 to 8, the reproducing apparatus described in an example 9 is characterized in that the image data is image data delivered from a network or image data read and output from a memory medium.

A reproducing system described in an example 10 includes a reproducing apparatus maintaining an already output frame until a normal frame can be output when interpolation is impossible for a frame whose abnormality is confirmed among frames obtained by decoding image data, an image data delivery server delivering image data, and a network connected to the image data delivery server.

In the reproducing system of an example 10, the reproducing system described in an example 11 is characterized in that the reproducing apparatus includes a first unit for determining abnormality of the frame, a second unit for determining whether interpolation is processable on a frame determined to be abnormal by the first unit, and a third unit for maintaining output of the already output frame when the interpolation is determined not to be processable by the second unit.

A reproducing method described in an example 12 includes maintaining an already output frame until a normal frame can be output when interpolation is impossible for a frame whose abnormality is confirmed among frames obtained by decoding image data.

In the reproducing method of the example 12, the reproducing method described in an example 13 includes determining whether the frame is abnormal or not, and determining whether interpolation of a frame determined to be abnormal is processable or not, and when interpolation is determined to be impossible, maintaining output of the already output frame.

In the reproducing method of the example 13, the reproducing method described in an example 14 includes maintaining the output of the already output frame when the frame whose interpolation is determined to be impossible exists within a predetermined number of frames from a subsequent key frame.

In the reproducing method of the example 13 or 14, the reproducing method described in an example 15 includes outputting the frame when the frame whose interpolation is determined to be impossible does not exist within a predetermined number of frames from a subsequent key frame.

In the reproducing method of the example 13, 14, or 15, the reproducing method described in an example 16 is characterized in that the frame has differential information with a right previous frame, and the interpolation is performed on the basis of the differential information.

In the reproducing method of one of the examples 13 to 16, the reproducing method described in an example 17 includes continuing the output until the subsequent key frame appears when the process of maintaining the output of the already output frame has been performed.

In the reproducing method of one of the examples 14 to 17, the reproducing method described in an example 18 includes determining whether the frame is a key frame or not, and calculating a frame interval from the key frame to a next key frame.

In the reproducing method of the example 13, the reproducing method described in an example 19 is characterized in that the frame has at least one of differential information with a right previous frame, differential information with a right previous key frame, and differential information with a subsequent key frame, and the method further includes performing interpolation on the basis of the differential information, and maintaining the output of the already output frame until a normal frame can be output.

In the reproducing method of one of the examples 12 to 19, the reproducing method described in an example 20 is characterized in that the image data is image data delivered from a network or image data read and output from a memory medium.

A program described in an example 21 causes a computer to execute a process of maintaining an already output frame until a normal frame can be output when interpolation is impossible for a frame whose abnormality is confirmed among frames obtained by decoding image data.

In the program of the example 21, the program described in an example 22 causes the computer to execute processes of: determining, at a first unit for, whether the frame is abnormal or not; determining, at a second unit, whether interpolation is processable for a frame determined to be abnormal by the first unit; and maintaining, at a third unit, output of an already output frame when the interpolation is determined not to be processable by the second unit.

In the program of the example 22, the program described in an example 23 causes the computer to execute a process of maintaining, at the third unit, the output of the already output frame when the frame whose interpolation is determined not to be processable by the second unit exists within a predetermined number of frames from a subsequent key frame.

In the program of the example 22 or 23, the program described in an example 24 causes the computer to execute a process of outputting, at the third unit, the frame when the frame whose interpolation is determined not to be processable by the second unit does not exist within a predetermined number of frames from a subsequent key frame.

In the program of the example 22, 23, or 24, the program described in an example 25 is characterized in that the frame has differential information with a right previous frame, and the program further causes the computer to execute, at the second unit, a process of performing the interpolation on the basis of the differential information.

In the program of one of the examples 22 to 25, the program described in an example 26 causes the computer to execute a process of continuing to maintain, at the third unit, the output until the subsequent key frame appears when the process of maintaining the output of the already output frame has been performed.

In the program of one of the examples 23 to 26, the program described in an example 27 further causes the computer to execute processes of: determining, at the first unit, whether the frame is a key frame; and calculating, at a key frame interval calculating unit, a frame interval from the key frame to a next key frame.

In the program of the example 22, the program described in an example 28 is characterized in that the frame has at least one of differential information with a right previous frame, differential information with a right previous key frame, and differential information with a subsequent key frame, and the program further causes the computer to execute processes of: performing, at the second unit, the interpolation on the basis of the differential information; and maintaining, at the third unit, the output of the already output frame until a normal frame can be output.

In the program of one of the examples 21 to 28, the program described in an example 29 is characterized in that the image data is image data delivered from a network or image data read and output from a memory medium.

A recording medium described in an example 30 records the program of one of the examples 21 to 29 thereon.

Next, examples of a reproducing method according to the present invention are described with reference to FIGS. 2, 5 to 8.

EXAMPLE I

Here, it will be possible to designate the unit of the number of set frames X in various types such as a fraction of an interval between key frames, a number of frames, and second. Also, when a viewer side can change the number of set frames X, a client side can designate whether to raise a deterioration prevention rate of an image depending on the preference of the viewer, or whether to perform image reproduction that maintains smoothness (frame rate) in the movement of an image.

First, FIG. 5 describes a case where of frames (though seven frames are shown in FIG. 5, the number of frames is not limited thereto), a frame 1 is normal, frames 2 to 5 are abnormal, and frames 6 and 7 are normal. It is assumed that the frames 1 and 6 are key frames.

FIG. 5 is a view illustrating a relationship, where the number of set frames X is a maximum number of frames (for example, 900), among frames, normal/abnormal, interpolation possible/impossible, application/non application of output control, and output frames.

Regarding the frame 1 (key frame), since the frame 1 is normal, application of output control is not performed, and a normal frame 1 is output from the frame output unit 9 (same also in case of the third exemplary embodiment).

Regarding the frame 2, the frame 2 is abnormal, interpolation is possible, and the number of frames n=4 is smaller than the number of set frames X, so that application of output control is not performed, and a frame 2' that has been interpolated by the interpolation processor 6 is output from the frame output unit 9 (same also in case of the third exemplary embodiment).

Regarding the frame 3, the frame 3 is abnormal, interpolation is impossible, and the number of frames n=3 is smaller than the number of set frames X, so that application of output control is performed, the previous output frame 2' is maintained, and output from the frame output unit 9 (same also in case of the third exemplary embodiment).

Regarding the frame 4, the frame 4 is abnormal and interpolation is impossible. At this point, determination that the interpolation is impossible has been made twice. That is, in cases of the first and second exemplary embodiments, it is determined that output control is being made in step S104 of the flowchart in FIG. 2, and it is determined that the frame is not a key frame in step S105, so that step S116 is performed, and the frame 2', which is the already output frame, is output (same also in case of the third exemplary embodiment).

Regarding the frame 5, the frame 5 is abnormal and the interpolation is impossible. At this point, determination that the interpolation is impossible has been made three times. That is, in cases of the first and second exemplary embodiments, it is determined that output control is being made in step S104 of the flowchart in FIG. 2, and it is determined that the frame is not a key frame in step S105, so that step S116 is performed, and the frame 2', which is the already output frame is output (same also in case of the third exemplary embodiment).

Regarding the frame 6, since the frame 6 is normal and is a key frame, a normal frame 6 (key frame) is output from the frame output unit 9 (same also in case of the third exemplary embodiment).

Regarding the frame 7, since the frame 7 is normal, application of output control is not performed, and a normal frame 7 is output from the frame output unit 9 (same also in case of the third exemplary embodiment).

EXAMPLE II

It is possible to perform reproduction of an image that maintains smoothness in the movement of a frame though image quality is deteriorated more or less by setting a value of the number of set frames X within a key frame interval, that is, the number of frames n or less.

FIG. 6 is a view illustrating a relationship, where the number of set frames X is 2, among frames, normal/abnormal, interpolation possible/impossible, application/non application of output control, and output frames.

Regarding a frame 1, since the frame 1 is normal, application of output control is not performed, and the normal frame 1 (key frame) is output from the frame output unit 9 (same also in case of the third exemplary embodiment).

Regarding a frame 2, the frame 2 is abnormal, interpolation is possible, and the number of frames n=4 is larger than the number of set frames X, so that application of output control is not performed, and an interpolated frame 2' is output from the frame output unit 9 (same also in case of the third exemplary embodiment).

Regarding a frame 3, the frame 3 is abnormal, interpolation is impossible, and the number of frames n=3 is larger than the number of set frames X, so that an abnormal frame 3" is directly output from the frame output unit 9 according to the flowchart of FIG. 2 (same also in case of the third exemplary embodiment).

Regarding a frame 4, the frame 4 is abnormal and interpolation is impossible. At this point, determination that the interpolation is impossible has been made twice. That is, in cases of the third exemplary embodiment, it is determined that output control is being made in step S104 of the flowchart in FIG. 2, and it is determined that the frame is not a key frame in step S105, so that step S116 is performed, and the frame 3", which is the already output abnormal frame is directly output (same also in case of the third exemplary embodiment).

Regarding a frame 5, the frame 5 is abnormal, interpolation is impossible, and the number of frames n=1 is smaller than the number of set frames X, so that the abnormal frame 3', which is the previous frame, is output from the frame output unit 9 according to the flowchart of FIG. 2 (same also in case of the third exemplary embodiment).

Regarding a frame 6, since the frame 6 is normal, application of output control is not performed, and the normal frame 6 (key frame) is output from the frame output unit 9 (same also in case of the third exemplary embodiment).

Regarding a frame 7, since the frame 7 is normal, application of output control is not performed, and the normal frame 7 is output from the frame output unit 9 (same also in case of the third exemplary embodiment).

EXAMPLE III

FIG. 7 describes a case where frames 1 and 2 are normal, a frame 3 is abnormal, a frame 4 is normal, a frame 5 is abnormal, and frames 6 and 7 are normal. It is assumed that the frames 1 and 6 are key frames.

FIG. 7 is a view illustrating other relationship, where the number of set frames X is a maximum number of frames (for example, 900), among frames, normal/abnormal, interpolation possible/impossible, application/non application of output control, and output frames.

Regarding a frame 1, since the frame 1 is normal, application of output control is not performed, and the normal frame 1 is output from the frame output unit 9 (same also in case of the third exemplary embodiment).

Regarding a frame 2, since the frame 2 is normal, application of output control is not performed, and the normal frame 2 is output from the frame output unit 9 (same also in case of the third exemplary embodiment).

Regarding a frame 3, the frame 3 is abnormal, interpolation is possible, and the number of frames n=3 is smaller than the number of set frames X, so that application of output control is not performed, and an interpolated frame 3' is output from the frame output unit 9 (same also in case of the third exemplary embodiment).

Regarding a frame 4, since the frame 4 is normal and interpolation is impossible, application of output control is not performed, and the normal frame 4 is output from the frame output unit 9 (same also in case of the third exemplary embodiment).

Regarding a frame 5, the frame 5 is abnormal, interpolation is impossible, and the number of frames n=1 is smaller than the number of set frames X, so that application of output control is performed, the previous output image is maintained, and the frame 4 is output from the frame output unit 9 (same also in case of the third exemplary embodiment).

Regarding a frame 6, since the frame 6 is normal, application of output control is not performed, and the normal frame 6 (key frame) is output from the frame output unit 9 (same also in case of the third exemplary embodiment).

Regarding a frame 7, since the frame 7 is normal, application of output control is not performed, and the normal frame 7 is output from the frame output unit 9 (same also in case of the third exemplary embodiment).

EXAMPLE IV

FIG. 8 is a view illustrating other relationship, where the number of set frames X is 2, among frames normal/abnormal, interpolation possible/impossible, application/non application of output control, and output frames.

Regarding a frame 1, since the frame 1 is normal, application of output control is not performed, and the normal frame 1 (key frame) is output from the frame output unit 9 (same also in case of the third exemplary embodiment).

Regarding a frame 2, since the frame 2 is normal, application of output control is not performed, and the normal frame 2 is output from the frame output unit 9 (same also in case of the third exemplary embodiment).

Regarding a frame 3, the frame 3 is abnormal, interpolation is possible, and the number of frames n=3 is larger than the number of set frames X, so that application of output control is not performed, and a frame 3' interpolated by the interpolation processor 6 is output from the frame output unit 9 (same also in case of the third exemplary embodiment).

Regarding a frame 4, since the frame 4 is normal, application of output control is not performed, and the normal frame 4 is output from the frame output unit 9 (same also in case of the third exemplary embodiment).

Regarding a frame 5, the frame 5 is abnormal, interpolation is impossible, and the number of frames n=1 is smaller than the number of set frames X, so that application of output control is performed, the previous output frame 4 is maintained and output from the frame output unit 9 (same also in case of the third exemplary embodiment).

Regarding a frame 6, since the frame 6 is normal, application of output control is not performed, and the normal frame 6 (key frame) is output from the frame output unit 9 (same also in case of the third exemplary embodiment).

Regarding a frame 7, since the frame 7 is normal, application of output control is not performed, and the normal frame 7 is output from the frame output unit 9 (same also in case of the third exemplary embodiment).

In FIGS. 5 to 8, the frames 1, 2, 3, . . . represent decoded frames, "normal/abnormal" represents whether destruction or a loss is generated to a packet forming the decoded frames 1, 2, 3, . . . , and "interpolation possible/impossible" represents whether interpolation is possible or not in the case where abnormality is generated to a frame. "application/non application of output control" represents whether to output a previous output image until the next normal frame or interpolated frame can be output, or whether to directly output an abnormal frame. Also, an "output frame" represents one of normal frames 1, 2, 3, . . . , interpolated frames 1', 2', 3', . . . , abnormal frames 1", 2", 3", . . . .

Here, it is revealed from the first to fourth exemplary embodiments that a frequency by which the present invention is applied to image data abnormality is large in the case where the number of set frames X is greater than the number of frames n.

Therefore, quality appears excellent when the number of set frames X is larger than the number of frames n at a first glance. However, in the case where contents of image data are suspense movies or action dramas, a viewer desires to view a critical moment. In that case, it may be preferable that a frame is displayed though corresponding image data are destroyed more or less. In the case where the viewer desires to view the next moment anyway, when reproduction suspends at a previous scene, the viewer is dissatisfied. Also, since the scene suspends as described above, smoothness reduces.

Therefore, a viewer desiring to a critical moment rather than obtaining image quality may set the number of set frames X to a minimum limit. A viewer having priority over image quality may set the number of set frames X to a maximum limit of the number of frames n.

[Operation Effect]

An effect according to the present invention is that it is possible to maintain a real-time characteristic with respect to an abnormal frame of received image data during a streaming delivery, and also subjectively prevent deterioration in the quality of an output frame even under a streaming condition where retransmission is impossible such as multicast. This is because the present invention does not require retransmission.

Another effect according to the present invention is that it is possible to subjectively prevent deterioration in the quality of an output frame even in the case where there are many abnormal frames, or in the case where interpolation is impossible due to scene switching. This is because the interval between key frames is obtained and an output frame is controlled.

Still another effect according to the present invention is that it is possible for a reception side to subjectively prevent deterioration in the quality of an output image without depending on specification of a transmission side such as a parity of FEC. This is because special information or data except received data is not required when the present invention is embodied.

Also, the above-described embodiments are provided as exemplary preferred embodiments of the present invention, and not limited thereto, but can be embodied in various modifications without departing from the spirit and scope of the present invention. For example, although the above-described embodiments have explained for the case of streaming delivery, the present invention is not limited to streaming, but is applicable to even image data on a memory unit as long as it is image data of the type where the number of occurrences of abnormal frames can be determined.

In the case where abnormality exists at image data on the memory unit, it is impossible to perform re-reading/input corresponding to retransmission in steaming, so that the present invention is valid.

What is claimed is:

1. A reproducing method, comprising:
   determining whether a frame obtained by decoding image data is abnormal or not and whether the frame is a key frame;
   determining whether interpolation is processable on the frame determined to be abnormal;
   calculating a frame interval from the key frame to a next key frame by measuring an average of appearing intervals of key frames;
   calculating a number of frames from a current frame up to the next key frame when the interpolation is determined not to be processable; and
   when the interpolation is determined not to be processable, maintaining output of the already output frame until a normal frame can be output depending on the number of frames.

2. The method of claim 1, further comprising:
   outputting the frame when the frame whose interpolation is determined not to be processable does not exist within a predetermined number of frames from a subsequent key frame.

3. The reproducing method of claim 1, wherein the frame has differential information with a right previous frame, and the interpolation is performed on the basis of the differential information.

4. The reproducing method of claim 1, wherein the output is continuously maintained until a subsequent key frame appears when a process of maintaining the output of the already output frame has been performed.

5. The reproducing method of claim 1, wherein the frame has at least one of differential information with a right previous frame, differential information with a right previous key frame, and differential information with a subsequent key frame, and the method further comprises:
   performing interpolation on the basis of the differential information; and
   maintaining the output of the already output frame until a normal frame can be output.

6. The reproducing method of claim 1, wherein the image data is an image data delivered from a network, or image data read out from a memory medium.

7. A reproducing apparatus, comprising:
   a first unit that determines whether a frame obtained by decoding image data is abnormal or not and whether the frame is a key frame;
   a second unit that determines whether interpolation is processable on the frame determined to be abnormal by the first unit;
   a key frame interval calculator that calculates a frame interval from the key frame to a next key frame by measuring an average of appearing intervals of key frames and calculates a number of frames from a current frame up to the next key frame when the interpolation is determined not to be processable by the second unit; and
   a third unit that maintains output of an already output frame until a normal frame can be output depending on the number of frames when the interpolation is determined not to be processable by the second unit.

8. The reproducing apparatus of claim 7, wherein when the frame whose interpolation is determined not to be processable by the second unit does not exist within a predetermined number of frames from a subsequent key frame, the third unit outputs the frame.

9. The reproducing apparatus of claim 7, wherein the frame has differential information with a right previous frame, and the second unit performs the interpolation on the basis of the differential information.

10. The reproducing apparatus of claim 7, wherein when performing a process of maintaining the output of the already output frame, the third unit continues to maintain the output until a subsequent key frame appears.

11. The reproducing apparatus of claim 7, wherein the frame has at least one of differential information with a right previous frame, differential information with a right previous key frame, and differential information with a subsequent key frame, the second unit performs the interpolation on the basis of the differential information, and
   the third unit maintains the output of the already output frame until a normal frame can be output.

12. The reproducing apparatus of claim 7, wherein the image data comprises image data delivered from a network, or image data read out from a memory medium.

13. A reproducing system, comprising:
   a reproducing apparatus;
   an image data delivery server delivering image data; and
   a network connected to the image data delivery server,
   wherein the reproducing apparatus comprises:
   a first unit that determines whether a frame obtained by decoding the image data is abnormal or not and whether the frame is a key frame;
   a second unit that determines whether interpolation is processable on the frame determined to be abnormal by the first unit;
   a key frame interval calculator that calculates a frame interval from the key frame to a next key frame by measuring an average of appearing intervals of key frames and calculates a number of frames from a current frame up to the next key frame when the interpolation is determined not to be processable by the second unit; and
   a third unit that maintains output of an already output frame until a normal frame can be output depending on the number of frames when the interpolation is determined not to be processable by the second unit.

14. A non-transitory recording medium recording a program for causing a computer to execute a processor, the process comprising:
   determining whether a frame obtained by decoding image data is normal or not and whether the frame is a key frame;
   determining whether interpolation is processable on the frame determined to be abnormal;
   calculating a frame interval from the key frame to a next key frame by measuring an average of appearing intervals of key frames;
   calculating a number of frames from a current frame up to the next key frame when the interpolation is determined not to be processable; and
   maintaining output of an already output frame until a normal frame can be output depending on the number of frames when the interpolation is determined not to be processable.

15. The non-transitory recording medium recording a program of claim 14, wherein the program further causes the computer to execute a process of maintaining the output of the already output frame when the frame whose interpolation is determined not to be processable exists within a predetermined number of frames from a subsequent key frame.

16. The non-transitory recording medium recording a program of claim 14, wherein the program further causes the computer to executes a process of outputting the frame when the frame whose interpolation is determined not to be processable does not exist within a predetermined number of frames from a subsequent key frame.

17. The non-transitory recording medium recording a program of claim 14, wherein the frame has differential information with a right previous frame, and the program further causes the computer to execute a process of performing interpolation on the basis of the differential information.

18. The non-transitory recording medium recording a program of claim 14, wherein the program further causes the computer to execute a process of continuing to maintain the output until the subsequent key frame appears when the maintaining the output of the already output frame has been performed.

19. The non-transitory recording medium recording a program of claim 14, wherein the frame has at least one of differential information with a right previous frame, differential information with a right previous key frame, and differential information with a subsequent key frame, wherein the program causes the computer to execute a process of:
   performing the interpolation on the basis of the differential information, and
   maintaining the output of the already output frame until a normal frame can be output.

20. The non-transitory recording medium recording a program of claim 14, wherein the image data comprises image data delivered from a network, or image data read out from a memory medium.

* * * * *